(12) United States Patent
Cho et al.

(10) Patent No.: US 9,015,683 B2
(45) Date of Patent: Apr. 21, 2015

(54) METHOD AND APPARATUS FOR TRANSFORMING PROGRAM CODE

(75) Inventors: Seung-Mo Cho, Seoul (KR); Jong-Deok Choi, Seongnam-si (KR); Jaejin Lee, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 551 days.

(21) Appl. No.: 12/977,786

(22) Filed: Dec. 23, 2010

(65) Prior Publication Data

US 2011/0161944 A1 Jun. 30, 2011

(30) Foreign Application Priority Data

Dec. 30, 2009 (KR) ........................ 10-2009-0134367

(51) Int. Cl.
G06F 9/44 (2006.01)
G06F 9/45 (2006.01)

(52) U.S. Cl.
CPC ................ G06F 8/458 (2013.01); G06F 8/433 (2013.01); G06F 8/456 (2013.01)

(58) Field of Classification Search
CPC ...................................... G06F 8/433
USPC .......................................................... 717/149
See application file for complete search history.

(56) References Cited

U.S. PATENT DOCUMENTS

| 7,512,950 | B1 * | 3/2009 | Marejka ........................ 718/106 |
| 7,770,170 | B2 | 8/2010 | Rector et al. |
| 8,286,198 | B2 * | 10/2012 | Munshi et al. ................. 719/328 |
| 2005/0097509 | A1 | 5/2005 | Rong et al. |
| 2005/0289523 | A1 * | 12/2005 | Spektor et al. ................. 717/140 |
| 2007/0169042 | A1 | 7/2007 | Janczewski |
| 2008/0184211 | A1 | 7/2008 | Nickolls et al. |
| 2008/0244549 | A1 * | 10/2008 | Kejariwal et al. ............. 717/160 |
| 2009/0144529 | A1 * | 6/2009 | Eichenberger et al. ........ 712/241 |
| 2010/0138810 | A1 * | 6/2010 | Komatsu et al. ............... 717/107 |
| 2010/0306651 | A1 * | 12/2010 | Quennesson et al. .......... 715/704 |
| 2011/0161943 | A1 * | 6/2011 | Bellows et al. ................ 717/149 |
| 2011/0161944 | A1 * | 6/2011 | Cho et al. ...................... 717/149 |

(Continued)

FOREIGN PATENT DOCUMENTS

| KR | 10-2008-0038301 | 5/2008 |
| KR | 10-2008-0070599 | 7/2008 |

OTHER PUBLICATIONS

Nvidia, OpenCL Programming for the CUDA Architecture, Nvidia Corporation (Published Aug. 31, 2009).*

(Continued)

*Primary Examiner* — Don Wong
*Assistant Examiner* — Theodore Hebert
(74) *Attorney, Agent, or Firm* — NSIP Law

(57) ABSTRACT

Provided is a method of transforming program code written such that a plurality of work-items are allocated respectively to and concurrently executed on a plurality of processing elements included in a computing unit. A program code translator may identify, in the program code, two or more code regions, which are to be enclosed by work-item coalescing loops (WCLs), based on a synchronization barrier function contained in the program code, such that the work-items are serially executable on a smaller number of processing elements than a number of the processing elements, and may enclose the identified code regions with the WCLs, respectively.

19 Claims, 11 Drawing Sheets

(56) References Cited

U.S. PATENT DOCUMENTS

2011/0161976 A1* 6/2011 Alexander et al. ............ 718/104
2012/0173847 A1* 7/2012 Moy et al. ...................... 712/32

OTHER PUBLICATIONS

Nvidia, OpenCL Programming for the CUDA Architecture, Nvidia Corporation (Published Aug. 31, 2009) ("Nvidia").*

Han et al., hiCUDA: A high-level Directive-based Language for GPU Programming, ACM (Published Mar. 8, 2009), retrieved from http://www.eecg.toronto.edu/~han/papers/hicuda-gpgpu09.pdf on Sep. 26, 2014.*

Khronos, The OpenCL Specification, Khronos Group, Ed. Aaftab Munshi (Published Oct. 6, 2009).*

Lee et al., "An OpenCL Framework for Heterogeneous Multicores with Local Memory," *In Proceeding of the 19th International Conference on Parallel Architectures and Compilation Techniques*, 2010, pp. 1-10.

* cited by examiner

FIG. 2A

```
void vec_add(int n,
             float *a,
             float *b,
             float *c)
{
  int i;

for (i=0; i<n; i++)
    c[i] = a[i]+b[i];
}
```

FIG. 2B

```
__kernel
void vec_add(__global float *a,
             __global float *b,
             __global float *c)
{
  int id;

id = get_global_id(0);
  c[id] = a[id]+b[id];
}
```

FIG. 2C

```
#define get_global_id(N)   \
    (__global_id[N] + (N == 0 ? __i : (N == 1 ? __j : __k)))
int __i, __j, __k;
__kernel void vec_add
    (__global float *a, __global float *b, __global float *c)
{
  int id;
  for ( __k = 0; __k < __local_size[2]; __k++ ) {
    for ( __j = 0; __j < __local_size[1]; __j++ ) {
      for ( __i = 0; __i < __local_size[0]; __i++ ) {
        id = get_global_id(0);
        c[id] = a[id] + b[id];
      }
    }
  }
}
```

METHOD AND APPARATUS FOR TRANSFORMING PROGRAM CODE

CROSS-REFERENCE TO RELATED APPLICATION(S)

This application claims the benefit under 35 U.S.C. §119(a) of Korean Patent Application No. 10-2009-0134367, filed on Dec. 30, 2009, the entire disclosure of which is incorporated herein by reference for all purposes.

BACKGROUND

1. Field

The following description relates to program compiling, and more particularly, to a method and apparatus for transforming a program written for parallel data processing.

2. Description of the Related Art

Open computing language (OpenCL) is a standard for parallel programming on is heterogeneous processing platforms such as central processing units (CPUs), graphics processing units (GPUs), accelerators, and other processors. OpenCL allows the use of the same program source on various platforms, thereby giving software developers portability and enabling them to easily use the processing power of the platforms.

SUMMARY

In one general aspect, there is provided a method of transforming program code written such that a plurality of work-items are allocated respectively to and concurrently executed on a plurality of processing elements included in a computing unit, the method including: identifying, in the program code, two or more code regions, which are to be enclosed by work-item coalescing loops (WCLs), based on a synchronization barrier function contained in the program code, such that the work-items are serially executable on a smaller number of processing elements than a number of the processing elements, and enclosing the identified code regions with the WCLs, respectively.

In the method, the program code may be open computing language (OpenCL) kernel code.

In the method, each of the WCLs may include a nested loop corresponding to a dimension of identifiers of the work-items.

In the method, in response to the identifiers of the work-items being three-dimensional (3D) identifiers, each of the WCLs may include a triply nested loop.

The method may further include, in response to a private variable contained in the program code being defined in one of the identified code regions and being used in another identified code region, expanding the private variable to include the dimension of the identifiers of the work-items.

The method may further include: allocating a memory to store the expanded private variable, and adding code for releasing the allocated memory.

In the method, the identifying of the code regions may include: in response to the synchronization barrier function being contained in a conditional statement: identifying, outside the conditional statement: a region including at least one statement before the conditional statement, and a region including at least one statement after the conditional statement, and identifying, inside the conditional statement: a region including at least one statement, which is executed based on a first result of a statement specifying a condition, before the synchronization barrier function, a region including at least one statement after the synchronization barrier function, and a region including at least one statement which is executed based on a second result of the statement specifying the condition.

The method may further include storing a result value of the statement specifying the condition, the result value being: integrated with the region including at least one statement before the conditional statement, and enclosed by a WCL.

In the method, the identifying of the code regions may include: in response to the synchronization barrier function being contained in a loop statement: identifying, outside the loop statement: a region including at least one statement before the loop statement, and a region including at least one statement after the loop statement, and identifying, inside the loop statement: a region including a statement that specifies a condition, a region including at least one statement before the synchronization barrier function, and a region including at least one statement after the synchronization barrier function.

In another general aspect, there is provided an apparatus for transforming program code written such that a plurality of work-items are allocated respectively to and concurrently is executed on a plurality of processing elements included in a computing unit, the apparatus including: processor configured to: identify, in the program code, two or more code regions, which are to be enclosed by work-item coalescing loops (WCLs), based on a synchronization barrier function contained in the program code, such that the work-items are serially executable on a smaller number of processing elements than a number of the processing elements, and enclose the identified code regions with the WCLs, respectively.

In the apparatus, the program code may be open computing language (OpenCL) kernel code.

In the apparatus, each of the WCLs may include a nested loop corresponding to a dimension of identifiers of the work-items.

In the apparatus, in response to the identifiers of the work-items being three-dimensional (3D) identifiers, each of the WCLs may include a triply nested loop.

In the apparatus, the processor may be further configured to, in response to a private variable contained in the program code being defined in one of the identified code regions and being used in another identified code region, expand the private variable to include the dimension of the identifiers of the work-items.

In the apparatus, the processor may be further configured to: allocate a memory to store the expanded private variable, and add code for releasing the allocated memory.

In the apparatus, the processor being configured to identify the code regions may include: in response to the synchronization barrier function being contained in a conditional statement: identifying, outside the conditional statement: a region including at least one statement before the conditional statement, and a region including at least one statement after the conditional statement, and identifying, inside the conditional statement: a region including at least one statement, which is executed based on a first result of a statement specifying a condition, before the synchronization barrier function, a region including at least one statement after the synchronization barrier function, and a region including at least one statement which is executed based on a second result of the statement specifying the condition.

In the apparatus, the processor may be further configured to store a result value of the statement specifying the condition, the result value being: integrated with the region including at least one statement before the conditional statement, and enclosed by a WCL.

In the apparatus, the processor being further configured to identify the code regions may include: in response to the synchronization barrier function being contained in a loop statement: identifying, outside the loop statement: a region including at least one statement before the loop statement, and a region including at least one statement after the loop statement, and identifying, inside the loop statement: a region including a statement that specifies a condition, a region including at least one statement before the synchronization barrier function, and a region including at least one statement after the synchronization barrier function.

Other features and aspects may be apparent from the following detailed description, the drawings, and the claims.

BRIEF DESCRIPTION OF THE DRAWINGS

FIG. 2A is a diagram illustrating an example of a C program.

FIG. 2B is a diagram illustrating an example of kernel code for the C program of FIG. 2A.

FIG. 2C is a diagram illustrating the result of transforming the kernel code of FIG. 2B by using an example kernel code transformation method.

Figure 1:
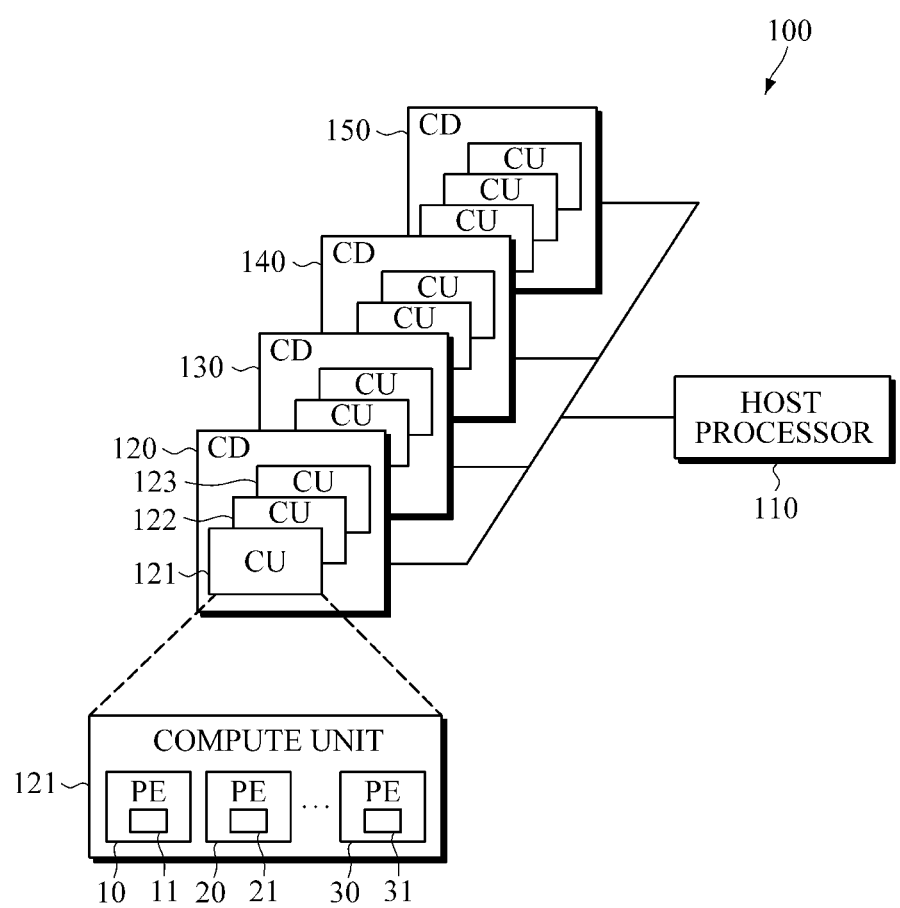
FIG. 1 is a diagram illustrating an example structure of a system on which an open computing language (OpenCL) program runs.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

The following description relates to a method of transforming open computing language (OpenCL) kernel code written for processing by a plurality of processing elements, so that the OpenCL kernel code can be efficiently used by a device having a limited number of processing elements.

FIG. 1 is a diagram illustrating an example structure of a system 100 on which an open computing language (OpenCL) program runs.

Referring to FIG. 1, the OpenCL program may run on a platform which may include a host processor 110 and one or more computing devices 120 through 150.

Each of the computing devices 120, 130, 140, and 150 may include one or more computing units. For example, the computing device 120 may include a plurality of computing units 121, 122, and 123. Each computing unit may include one or more processing elements. For example, the computing unit 121 may include processing elements 10, 20, and 30. For example, a processing element may be a virtual scalar processor. The processing elements 10, 20, and 30 may include private memories 11, 21, and 31, respectively.

The OpenCL program may be written such that a host program running on a host processor may execute a kernel on a device. An OpenCL application may include a host program and kernels.

The host program may execute on the host processor 110 and may submit commands to perform computations on the processing elements 10, 20, and 30 within the computing device 120 or to manipulate memory objects.

A kernel is a function executed on an OpenCL device and may be written in OpenCL C. A kernel may also be referred to as "kernel code" or a "kernel function." Hereinafter, the kernel will be referred to as "kernel code." Kernel code may include a plurality of statements. To execute the kernel code, the host program may designate the number of work-groups and the number of work-items.

A "work-group" is a collection of work-items. Work-items are a kernel's execution units that are executed in parallel. One or more work-groups may include one or more work-items. A work-group may be assigned to a computing unit, and work-items included in the work-group may execute as if they were concurrently executed on one or more virtual elements.

In OpenCL, the host program may define a kernel as an N-dimensional abstract index space, where $1 \leq N \leq 3$. Each point in the index space may be specified by an N-tuple of integers with each dimension starting at zero. Each point may be associated with a kernel's execution instance which is called a "work-item."

The N-tuple is a global ID of a corresponding work-item. Each work-item may query its global ID and may perform a different task and access different data based on its global ID. For example, a task may be single program, multiple data (SPMD). An integer array of a length N (e.g., the dimension of the index space) may specify the number of work-items in each dimension of the index space and may be prepared by the host program for a kernel in response to a kernel command being enqueued.

Each work-group has a unique ID which is an N-tuple. An integer array of a length N (e.g., the dimension of the index space) may specify the number of work-groups in each dimension of the index space. A work-item in a work-group may be assigned a unique local ID, and the entire work-group may be treated as a local index space. A global ID of a work-item may be computed using its local ID and work-group ID. Work-items in a work-group may execute concurrently on processing elements of a single computing unit.

OpenCL defines four distinct memory regions: global, constant, local, and private. A computing device memory may include the global and constant memory regions. A kernel may statically allocate memory objects to the constant and local memory regions. The local memory region may be shared by all work-items in the same work-group. The private memory region may be local to one work-item and may be included in a processing element.

The above memory regions may be accessible by work-items, and OpenCL C may have four address space qualifiers to distinguish these memory regions: _global, _constant, _local, and _private. These address space qualifiers may be used in variable declarations in the kernel code.

As described above, a kernel program may be written such that a plurality of work-items are allocated to and executed on a plurality of processing elements, respectively. To execute the kernel program on a computing unit (or processor) having a smaller number of processing elements than the number of work-items that are to be executed, the processing elements may execute the work-items sequentially.

It may be presumed hereinafter that a plurality of work-items, which are to be executed, run on a single virtual processing element. When a work-group is assigned to a computing unit, a thread corresponding to the work-group assigned to the computing unit may perform context switching while executing work-items in the work-group one by one. For example, in response to 100 work-items being desired to be executed on one processing element, the processing element may have to call the kernel code whenever executing each of the 100 items sequentially.

OpenCL provides a work-group barrier function. The work-group barrier function may is be used in a kernel and synchronizes work-items in a single work-group that executes the kernel. The work-group barrier function may also be called a "synchronization barrier function," a "barrier function," or a "barrier." Each work-item in a work-group should execute a barrier and may not proceed to statements beyond the barrier until all other work-items in the work-group reach the barrier.

To execute work-items on a computing unit having a smaller number of processing elements than the number of the work-items, in response to a work-item reaching a work-group barrier, a thread executed by the computing unit may save the contents of the work-item's private memory and the processor state in a reserved space of a main memory (not shown) which may be located outside the computing unit and is used by the host processor 110. Then, the thread may switch to a next work-item.

In response to the kernel code for all work-items being executed so that all of the work-items reach the barrier, the thread may execute statements one by one again from a program point beyond the barrier after restoring the saved processor state and the saved contents of the private memory for each work-item. Work-item context switching may involve the process of saving and restoring the processor state and the private memory by using setjmp( ) and longjmp( ) functions, incurring a significant overhead.

According to an example, a processing element may efficiently serialize a plurality of work-items by using a work-item coalescing technique and may execute the serialized work-items. Work-item coalescing is a technique of transforming kernel code to serialize the concurrent executions of work-items in a single work-group in the presence of barriers in the kernel code and to sequentially execute the serialized work-items on a single processing element (or accelerator core).

An example work-item coalescing module may serialize_kernel code written for parallel processing. Thus, the work-item coalescing module may be called a "source-to-source translator." The source-to-source translator may run on a processor (e.g., a CPU) of a device that desires to serialize the kernel code written for parallel processing. The kernel code serialized by the source-to-source translator may be compiled into assembly code and may be executed on a target machine. The source-to-source translator will hereinafter be referred to as a "kernel code translator."

FIG. 2A is a diagram illustrating an example of a C program, FIG. 2B is a diagram illustrating an example of kernel code for the C program of FIG. 2A, and FIG. 2C is a diagram illustrating the result of transforming the kernel code of FIG. 2B by using an example kernel code transformation method.

FIG. 2A illustrates a C function that adds two vectors. Referring to FIG. 2A, in a "vec_add" function, the operation of adding vectors may be sequentially performed by increasing a variable "i" by one each time.

FIG. 2B illustrates the kernel code written such that the operation of adding two vectors as in the C program of FIG. 2A may be performed concurrently by a plurality of processing elements. A function get_global_id(0) returns a first element of the global ID of a work-item that executes a kernel. For example, the global ID may be in a three-dimensional format (a, b, c) and may indicate pointers composed of "a", "b", and "c" to memory objects included in a memory array. The host program may provide the kernel code with pointers to memory objects, so that the addition of memory vectors may be performed concurrently and in parallel by a plurality of processing elements.

FIG. 2C illustrates the result of transforming the kernel code of FIG. 2B by using the example kernel code transformation method. It can be understood from FIG. 2B that the transformed kernel code of FIG. 2C may include a three-dimensional "for" loop, in addition to the kernel code of FIG. 2B.

The transformed kernel code of FIG. 2C may sequentially execute all work-items in a single work-group one by one. In response to a work-group being assigned to a computing unit, the computing unit may actually execute the transformed kernel code for the kernel to emulate virtual processing elements in the computing unit.

The size of a work-group index space may be determined by array _local_size provided by OpenCL runtime. Array_global_id contains the global ID of a work-item having a local ID of (0, 0, 0) in the work-group.

In response to a processing element having to execute a plurality of work-items, if the kernel code is enclosed by a loop as in FIG. 2C, the processing element may not need to call the kernel code whenever executing each of the work-items. Instead, the work-items may be sequentially executed by calling the kernel code only once. In addition, when a barrier is contained in the kernel code, context overhead required in the process of saving and restoring the data of the private memory and the processor state information may be reduced. The loop used to serialize the kernel code may actually coalesce the work-items. Thus, the loop will hereinafter be referred to as a "work-item coalescing loop (WCL)."

Figure 3:
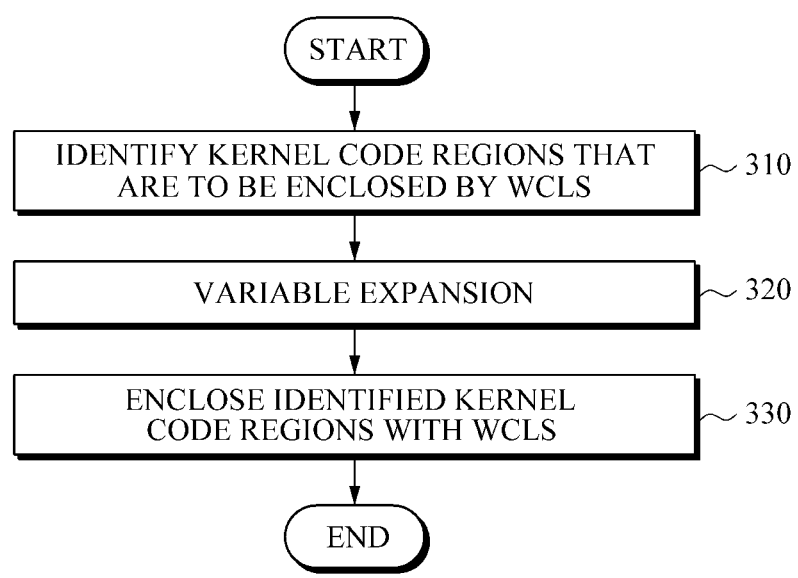
FIG. 3 is a flowchart illustrating an example method of transforming kernel code.

FIG. 3 is a flowchart illustrating an example method of transforming kernel code. Referring to FIG. 3, in operation 310, the kernel code translator may identify, in program code (e.g., kernel code), two or more kernel code regions, which are to be enclosed by WCLs, based on a synchronization barrier function contained in the program code, such that a plurality of work-items may be serially executed on a smaller number of processing elements than the number of the work-items. To this end, the kernel code translator may receive kernel code, create an abstract syntax tree (AST) for the kernel code, and identify kernel code regions that are to be enclosed by WCLs. Kernel code regions that need to be enclosed by WCLs are called "work-item coalescing regions (WCRs)."

To identify WCRs, the kernel code translator may mark each AST node which may include a barrier function call and each AST node's sub-tree, which may include a barrier function call. After marking each AST node, the kernel code translator may call a function that transforms the kernel code by using an example WCL.

Based on the marked information, the function that transforms the kernel code may be defined such that different WCR identification methods are used when no barrier is contained in the kernel code, when a barrier is contained in the kernel code, when a barrier is contained in a conditional statement, and when a barrier is contained in a loop statement. In other examples, e.g., when language constructs such as "for", "do-while", and "switch" are contained in the kernel code, the WCR identification methods used in the above four examples may be modified and applied accordingly.

In response to the kernel (code) containing a statement for calling a function that includes a barrier, the function, which is to be called, may be serially inlined with its ancestor nodes in a static call graph. The "static call graph" is a graph illustrating the call relationship between functions and may be written by the kernel code translator. After WCRs are identified in the transformed static call graph according to the above-described rules, WCLs may be applied.

A work-item private variable that is defined in one WCR and used in another WCR may require a separate storage location for each work-item. Therefore, in operation 320, the kernel code translator may expand a private variable of each work-item.

An example variable expansion technique is similar to scalar expansion. Scalar expansion may be typically applied to a loop nest to remove dependencies at the expense of is additional memory. However, the example variable expansion technique may be applied to multiple loop nests to transfer data defined in one loop nest to another loop nest. Variable expansion will be described in greater detail later with reference to FIGS. 8A and 8B. When the kernel code does not contain a work-item private variable that is defined in one WCR and used in another WCR, operation 320 may not be performed.

In operation 330, the kernel code translator may enclose the kernel code regions, which have been identified as WCRs, with WCLs. As defined in an OpenCL platform, in response to a three-dimensional (3D) ID being assigned to each work-item, the example kernel code translator may enclose the kernel code with a triply nested loop that iterates on the index space of a single work-group. However, as each work-item's ID may not be limited to the three-dimensional ID, a WCL that will enclose the kernel code may vary. That is, the WCL may be a single loop, a double loop, or the like.

As described above, OpenCL kernel code written for processing by a plurality of processing elements may be transformed for efficient use by a device having a limited number of processing elements. Accordingly, the OpenCL kernel code may be executed on various platforms, which, in turn, may enhance the portability of the OpenCL kernel code. In addition, the context-switching overhead required to virtualize processing elements may be reduced, improving performance.

Figure 4:
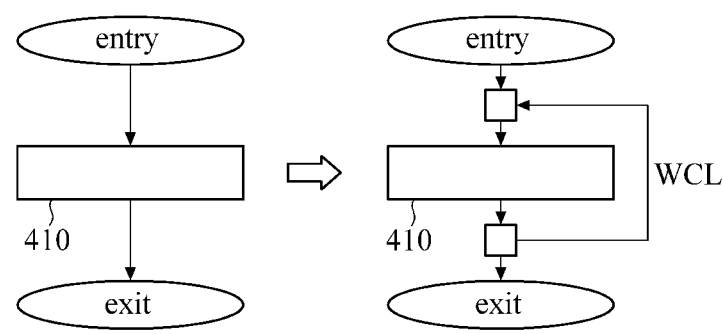
FIG. 4 is a diagram illustrating an example method of transforming kernel code when no barrier function is contained in the kernel code.

FIG. 4 is a diagram illustrating an example method of transforming kernel code when no barrier function is contained in the kernel code.

Referring to FIG. 4, a block 410 may be a compound statement or a list of statements. When no barrier function is contained in the kernel code, the start and end of the kernel code are enclosed by a WCL. Accordingly, the number of calls of the kernel code in a work-group may be reduced.

Figure 5:
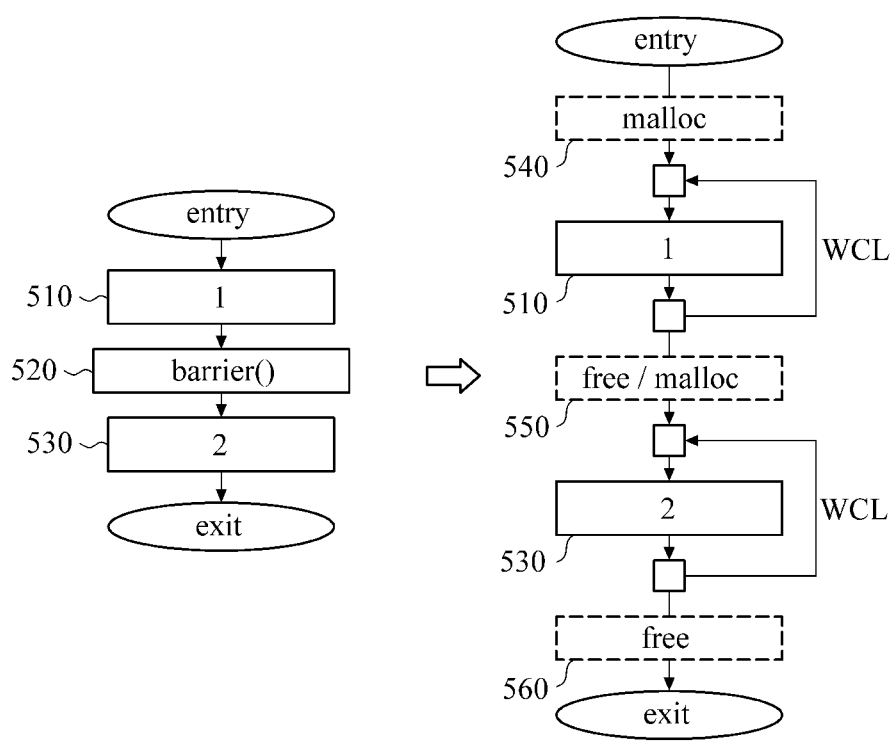
FIG. 5 is a diagram illustrating an example method of transforming kernel code when a barrier function is contained in the kernel code.

FIG. 5 is a diagram illustrating an example method of transforming kernel code when a barrier function is contained in the kernel code.

Referring to FIG. 5, blocks 510 and 530 each may be a compound statement or a list of statements. Based on a barrier 520, a region including the block 510 and a region including the block 530 may be identified as WCRs. The kernel code translator may enclose each region identified as a WCR with a WCL. For example, no statement may exist in the block 510 or 530. The region 510 or 530 without a statement may not be enclosed by a WCL.

The kernel code translator may expand a variable that moves between barriers and may add malloc( ) and free( ) functions as in blocks 540, 550, and 560 in order to allocate and release a memory for storing the expanded variable.

Figure 6:
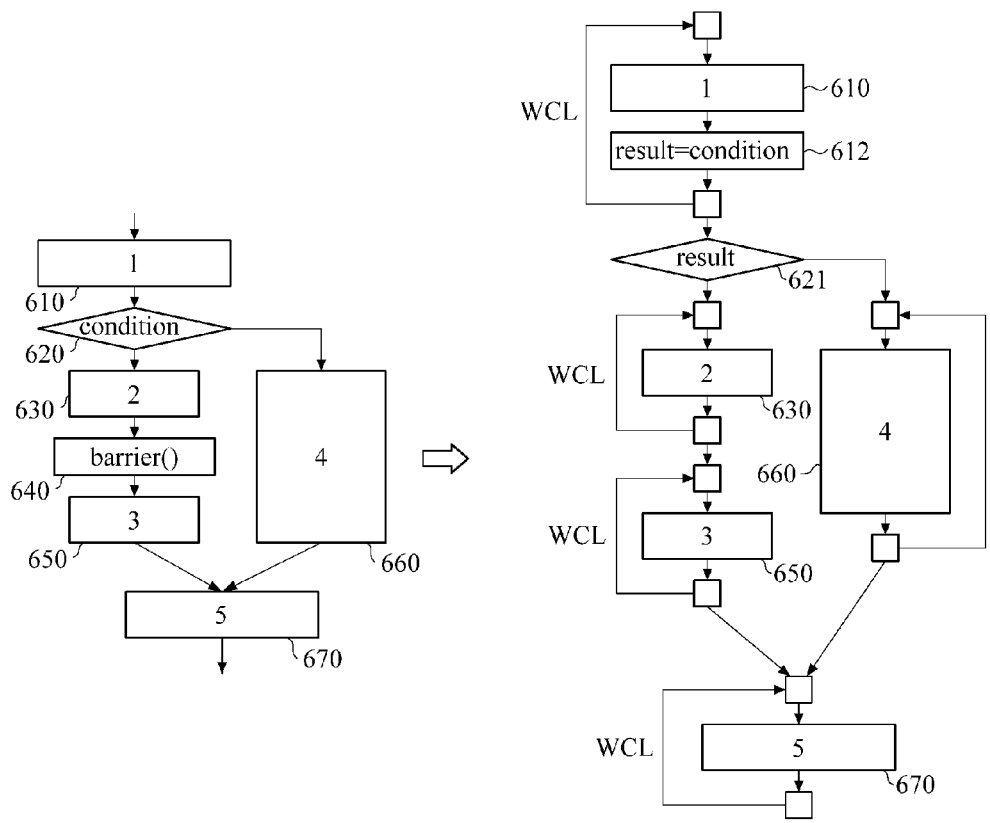
FIG. 6 is a diagram illustrating an example method of transforming kernel code when a barrier function is contained in a conditional statement of the kernel code.

FIG. 6 is a diagram illustrating an example method of transforming kernel code when a barrier function is contained in a conditional statement of the kernel code.

Referring to FIG. 6, a block 620 may be a statement specifying a condition such as "if", and blocks 610, 630, 650, 660, and 670 each may be a compound statement or a list of statements. Of these blocks, the blocks 620, 630, 650, and 660 may be statements (or codes) that constitute a conditional statement. According to the OpenCL specification, in response to a barrier being inside of a conditional statement, all work-items should enter the conditional if any work-item enters the conditional statement and executes the barrier.

When a barrier function 640 is contained in the conditional statement as shown in FIG. 6, the kernel code translator may identify WCRs inside and outside the conditional statement. Outside the conditional statement that includes the blocks 620, 630, 650, and 660, the kernel code translator may identify a region (e.g., a region including the block 610) including at least one statement before the conditional statement and a region (e.g., a region including the block 670) including at least one statement after the conditional statement.

Inside the conditional statement, the kernel code translator may identify a region (e.g., a region including the block 630) including at least one statement, which may be executed based on a first result of the statement 620, before the barrier function 640, a region (e.g., a region including the block 650) including at least one statement after the barrier function 640, and a region (e.g., a region including the block 660) including at least one statement which may be executed based on a second result of the statement 620.

In addition, as the statement 620, which may specify the condition, may remain unchanged for each work-item, the kernel code translator may transform the kernel code in a way that, in advance, an execution result value of the statement 620, as in a block 612, may be stored, and the stored result value in a block 621 may be used.

The execution result value of the statement 620 may be integrated with the block 610 and then may be enclosed by a WCL. Furthermore, the region including the block 630, the region including the block 650, and the region including the block 660 may be enclosed by WCLs, respectively.

Figure 7:
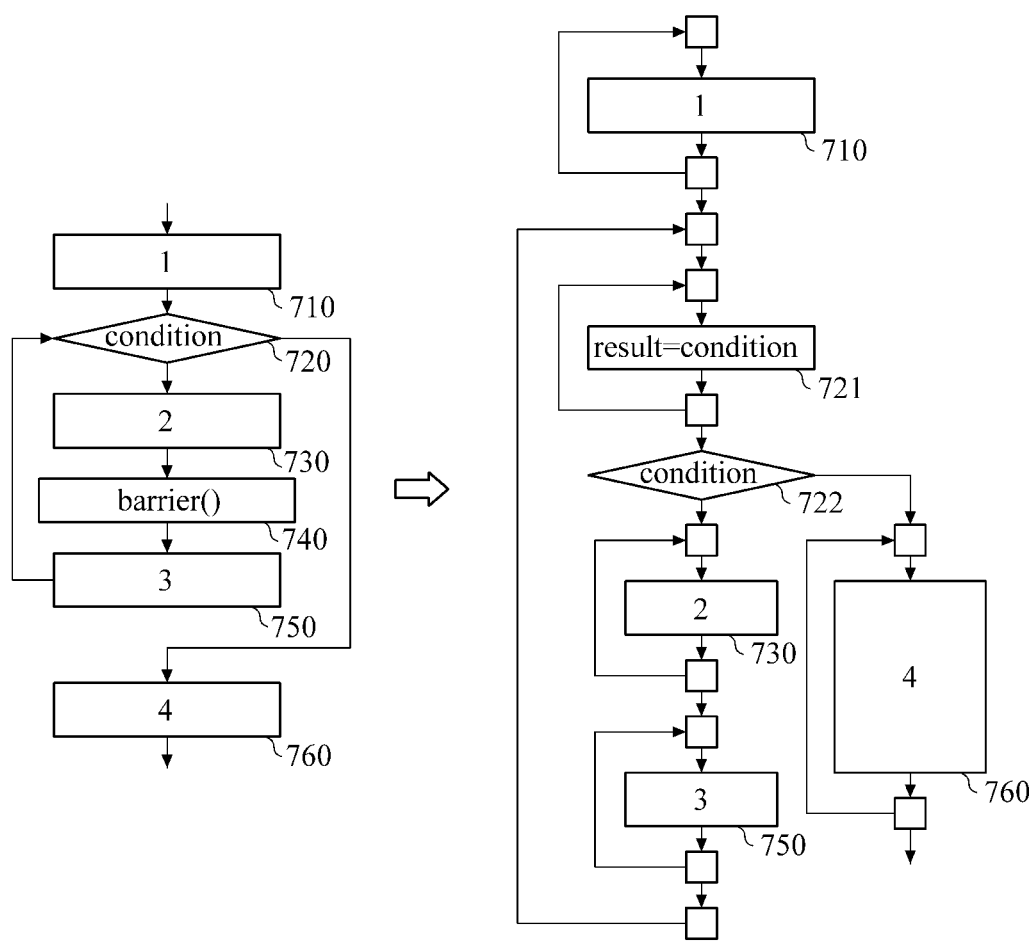
FIG. 7 is a diagram illustrating an example method of transforming kernel code when a barrier function is contained in a loop statement of the kernel code.

FIG. 7 is a diagram illustrating an example method of transforming kernel code when a barrier function is contained in a loop statement of the kernel code.

Referring to FIG. 7, a block 720 may be a statement specifying a condition, and blocks 710, 730, 750, and 760 each may be a compound statement or a list of statements. Of these blocks, the blocks 720, 730, and 750 may be codes that constitute a loop statement.

According to the OpenCL specification, in response to a barrier being inside a loop, all work-items should execute the barrier for each iteration of the loop before any are allowed to continue execution beyond the barrier. That is, once entering a conditional or loop, each statement inside the construct may be executed for all work-items in a work-group by iterating the work-group local index space, and the number of iterations of the loop may be the same for is all work-items in the work-group.

In response to a barrier function 740 being contained in the loop statement as shown in FIG. 7, the kernel code translator may identify WCRs inside and outside the loop statement that includes the blocks 720, 730, and 750. A code outside the loop statement may be executed only once for each work-item. However, a code inside the loop statement may be executed an equal number of times to the number of iterations of the loop statement for each work-item. Thus, WCRs may be identified separately inside and outside the loop statement.

Outside the loop statement that includes the blocks 720, 730, and 750, the kernel code translator may identify a region (e.g., a region including the block 710) including at least one statement before the loop statement and a region (e.g., a region including the block 760) including at least one statement after the loop statement.

Inside the loop statement, the kernel code translator may identify a region (e.g., a region including the block 720) including a statement that specifies a condition, a region (e.g., a region including the block 730) including at least one statement before the barrier function 740, and a region (e.g., a region including the block 750) including at least one statement after the barrier function 740.

In addition, as the statement 720 which specifies the condition may remain unchanged for each work-item, the kernel code translator may transform the kernel code in a way that, in advance, an execution result value of the statement 720, as in a block 721, may be stored and the stored result value in a block 722 may be used.

Consequently, the region including the block 710, the region including the block 721, the region including the block 730, the region including the block 750, and the region including the block 760 may be enclosed by WCLs, respectively. In addition, the original loop may enclose is the WCLs therein.

In response to variable expansion being required in a loop, the kernel code may be transformed such that a memory may be allocated before the execution of the loop starts and may be released after the execution of the loop ends. The transformation of the kernel code may prevent performance reduction resulting from repeated memory allocations and may release for variable expansion in the loop.

Figure 8A:
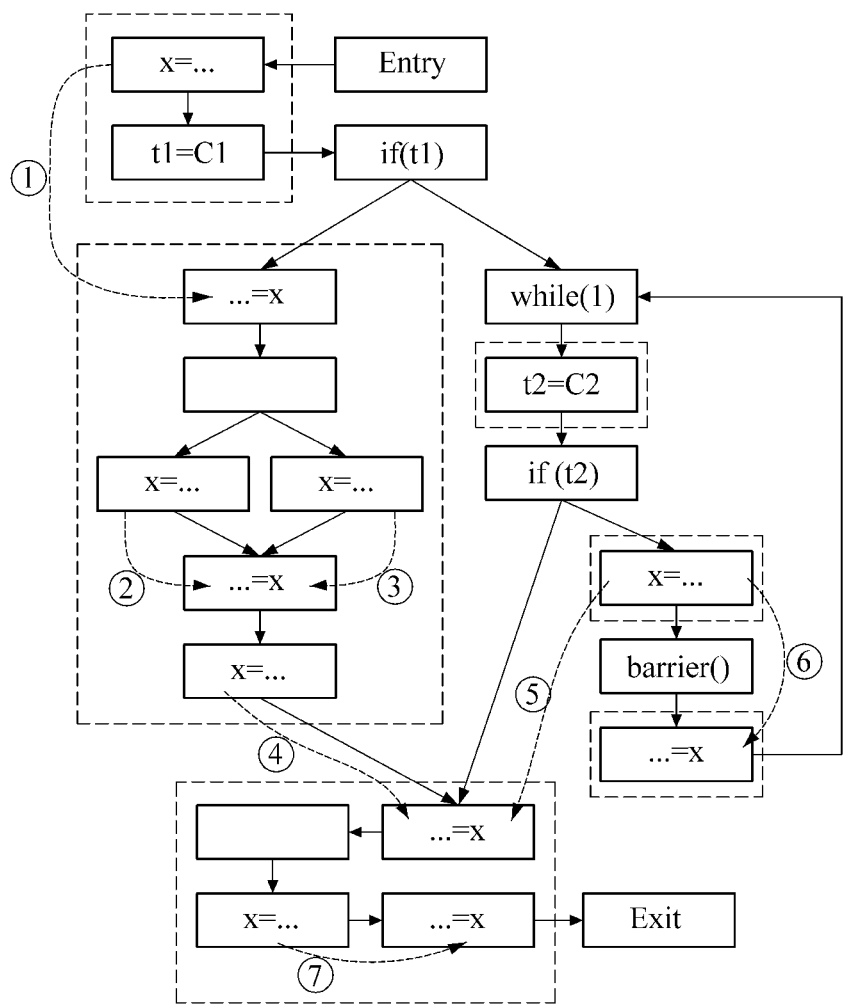
FIG. 8A is a diagram illustrating an example of a control flow graph after web identification.
Figure 8B:
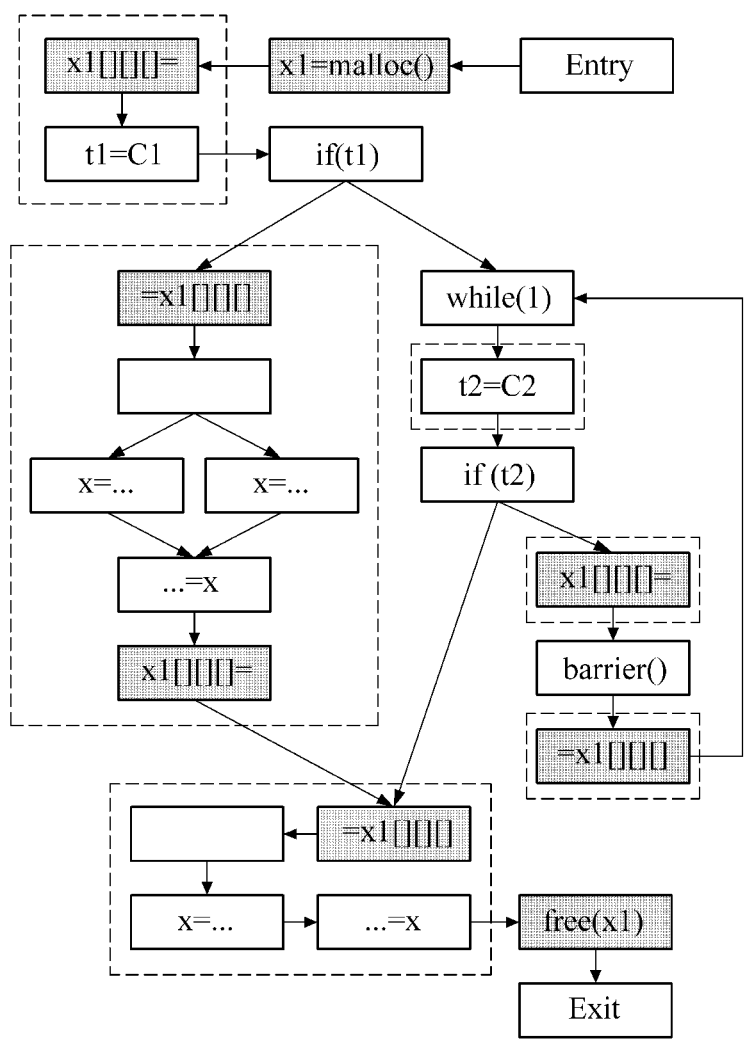
FIG. 8B is a diagram illustrating an example of a control flow graph after variable expansion.

FIG. 8A is a diagram illustrating an example of a control flow graph after web identification, and FIG. 8B is a diagram illustrating an example of a control flow graph after variable expansion.

For variable expansion, the kernel code translator may construct a source-level control flow graph of a kernel. Then, the kernel code translator may perform a data-flow analysis for work-item private variables and may construct a dominator tree and a post-dominator tree for the control flow graph.

The kernel code translator may find du-chains for each private variable in the control flow graph. A Definition-Use Chain (du-chain), includes a definition, "d", of a variable and all the uses, "u", reachable from that definition without any other intervening definitions. In the example du-chains, the kernel code translator may find webs for each private variable. The kernel code translator may find a web having du-chains that exist in different WCRs and may expand variables that belong to the web.

In an example variable expansion algorithm, a web is a unit of expansion. A web for a variable is all du-chains of the variable that contain a common use of the variable. A du-chain for a variable may connect, in the control flow graph, a node that defines the variable to a node that uses the defined variable. An advantage of using a web as a unit of expansion is that there may be no need to expand all the references of the variable. A variable may be expanded according to the dimension of identification information of a work-item.

FIG. 8A illustrates a control flow graph after identifying webs for a variable x. Referring to FIG. 8A, a dotted rectangle represents a WCR. All private variables used in the control flow graph are represented by 'x'. However, when newly defined as, e.g., 'x=...,' a private variable used in each node of the control flow graph may be different from another.

In FIG. 8A, there are six du-chains: {①}, {②}, {③}, {④}, {⑤}, {⑥}, {⑦}. These du-chains may produce four different webs: {①}, {②}, {③}, {④}, {⑤}, {⑥}, {⑦}. The definitions and uses of the variable x in the webs {①} and {④, ⑤, ⑥} may not belong to the same WCR. As a separate storage space may be required for each variable, the references of x used in the webs 101 and {①} and {④, ⑤, ⑥} may be replaced with a three-dimensional array. On the other hand, the variables x in the webs {②, ③} and {⑦} may not need to be expanded because they may belong to the same WCR.

FIG. 8B is a control flow graph illustrating the result of expanding the variable x used in the webs {①} and {④, ⑤, ⑥}. Referring to FIG. 8B, the variable x may be expanded to a variable 'x1([ ][ ][ ])' in a three-dimensional array format.

The kernel code translator may allocate a memory space to store an expanded variable and may construct a dominator tree and a post-dominator tree in a control flow graph. Then, the kernel code translator may identify a lowest common ancestor (LCA) among all nodes, which define the variable x, in the dominator tree and add a memory allocation function 'malloc( )' before a WCR that contains the LCA. Similarly, the kernel code translator may find an LCA in the post-dominator tree and may assign it as a successor and may add a memory free function 'free( )' after a WCR that contains the successor.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the devices described herein may be incorporated in or used in conjunction with mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup and/or set top box, and the like, consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of transforming program code written such that a plurality of work-items are concurrently executed on a plurality of processing elements included in a computing unit, the method comprising:
   identifying, in the program code executed at a computing unit, two or more code regions that are to be enclosed by work-item coalescing loops (WCLs) based on a synchronization barrier function contained in the program code, such that the work-items are serially executable on a smaller number of processing elements than a number of the work-items;
   enclosing the identified code regions with the WCLs; and
   in response to a private variable contained in the program code being defined in one of the identified code regions and being used in another identified code region, expanding the private variable according to a number of dimensions in identifiers of the work-items.

2. The method of claim 1, wherein the program code is open computing language (OpenCL) kernel code.

3. The method of claim 1, wherein, in response to the identifiers of the work-items being three-dimensional (3D) identifiers, each of the WCLs comprises a triply nested loop.

4. The method of claim 1, further comprising allocating a memory to store the expanded private variable and releasing the allocated memory.

5. The method of claim 1, wherein:
   in response to the synchronization barrier function being contained in a conditional statement and the conditional statement comprising a control region and a body, the identifying of the code regions comprises:
   identifying, outside the control region and the body of the conditional statement:
   a region comprising at least one statement before the conditional statement; and
   a region comprising at least one statement after the conditional statement; and
   identifying, inside the conditional statement:
   a region comprising at least one statement, which is executed based on a first result of a statement specifying a condition, before the synchronization barrier function;
   a region comprising at least one statement after the synchronization barrier function; and
   a region comprising at least one statement which is executed based on a second result of the statement specifying the condition.

6. The method of claim 5, further comprising storing a result value of the statement specifying the condition, the result value being:
   integrated with the region comprising at least one statement before the conditional statement; and
   enclosed by a WCL.

7. The method of claim 1, wherein in response to the synchronization barrier function being contained in a loop statement and the loop statement comprising a control region and a body, the identifying of the code regions comprises:
   identifying, outside the control region and the body of the loop statement:
   a region comprising at least one statement before the loop statement; and
   a region comprising at least one statement after the loop statement; and
   identifying, inside the loop statement:
   a region comprising a statement that specifies a condition;
   a region comprising at least one statement before the synchronization barrier function; and
   a region comprising at least one statement after the synchronization barrier function.

8. An apparatus for transforming program code written such that a plurality of work-items are concurrently executed on a plurality of processing elements included in a computing unit, the apparatus comprising:
   a processor configured to:
   identify, in the program code, two or more code regions, which are to be enclosed by work-item coalescing loops (WCLs), based on a synchronization barrier function contained in the program code, such that the work-items are serially executable on a smaller number of processing elements than a number of the work-item; and
   enclose the identified code regions with the WCLs; and
   in response to a private variable contained in the program code being defined in one of the identified code regions and being used in another identified code region, expanding the private variable according to a number of dimensions in identifiers of the work-items.

9. The apparatus of claim 8, wherein the program code is open computing language (OpenCL) kernel code.

10. The apparatus of claim 8, wherein, in response to the identifiers of the work-items being three-dimensional (3D) identifiers, each of the WCLs comprises a triply nested loop.

11. The apparatus of claim 8, wherein the processor is further configured to, in response to a private variable contained in the program code being defined in one of the identified code regions and being used in another identified code region, expand the private variable to comprise the dimension of the identifiers of the work-items.

12. The apparatus of claim 11, wherein the processor is further configured to allocate a memory to store the expanded private variable and release the allocated memory.

13. The apparatus of claim 8, wherein in response to the synchronization barrier function being contained in a conditional statement and the conditional statement comprising a control region and a body, the processor being further configured to identify the code regions comprises:
   identifying, outside the control region and the body of the conditional statement:
   a region comprising at least one statement before the conditional statement; and
   a region comprising at least one statement after the conditional statement; and
   identifying, inside the conditional statement:
   a region comprising at least one statement, which is executed based on a first result of a statement specifying a condition, before the synchronization barrier function;
   a region comprising at least one statement after the synchronization barrier function; and
   a region comprising at least one statement which is executed based on a second result of the statement specifying the condition.

14. The apparatus of claim 13, wherein the processor is further configured to store a result value of the statement specifying the condition, the result value being:
   integrated with the region comprising at least one statement before the conditional statement; and
   enclosed by a WCL.

15. The apparatus of claim 8, wherein
in response to the synchronization barrier function being contained in a loop statement and the loop statement comprising a control region and a body, the processor being further configured to identify the code regions comprises:
   identifying, outside the control region and the body of the loop statement:
   a region comprising at least one statement before the loop statement; and
   a region comprising at least one statement after the loop statement; and
   identifying, inside the loop statement:
   a region comprising a statement that specifies a condition;
   a region comprising at least one statement before the synchronization barrier function; and
   a region comprising at least one statement after the synchronization barrier function.

16. The method of claim 1, wherein each of the WCLs comprises a nested loop comprising a number of nesting levels that matches a number of dimensions in identifiers of the work-items.

17. The method of claim 1, wherein expanding the private variable comprises constructing a source-level control flow graph of a kernel.

18. The apparatus of claim 8, wherein each of the WCLs comprises a nested loop comprising a number of nesting levels that matches a number of dimensions in identifiers of the work-items.

19. The apparatus of claim 8, wherein expanding the private variable comprises constructing a source-level control flow graph of a kernel.

* * * * *